United States Patent
Chai et al.

(10) Patent No.: US 9,744,629 B2
(45) Date of Patent: Aug. 29, 2017

(54) POWER SUPPLY AND METHOD FOR ASSEMBLING POWER SUPPLY

(71) Applicant: Delta Electronics (Shanghai) Co., Ltd., Shanghai (CN)

(72) Inventors: Zhao-Wei Chai, Shanghai (CN); Ching-Ho Chou, Shanghai (CN); Dow Chen, Shanghai (CN); Shang-Yu Li, Shanghai (CN); Po-Heng Chao, Shanghai (CN); Jui-Ching Lee, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 216 days.

(21) Appl. No.: 14/583,186

(22) Filed: Dec. 25, 2014

(65) Prior Publication Data
US 2015/0216065 A1 Jul. 30, 2015

(30) Foreign Application Priority Data
Jan. 28, 2014 (CN) .......................... 2014 1 0042041

(51) Int. Cl.
G06F 1/16 (2006.01)
B23P 15/00 (2006.01)
B23P 19/04 (2006.01)
F21V 23/02 (2006.01)

(52) U.S. Cl.
CPC ............... *B23P 15/00* (2013.01); *B23P 19/04* (2013.01); *F21V 23/023* (2013.01); *G06F 1/1656* (2013.01); *Y10T 29/49002* (2015.01); *Y10T 29/49174* (2015.01); *Y10T 29/49947* (2015.01)

(58) Field of Classification Search
CPC ................................ F21V 23/02; G06F 1/1655
See application file for complete search history.

(56) References Cited

U.S. PATENT DOCUMENTS

| 7,897,234 | B2* | 3/2011 | Selverian | C08L 95/00 174/521 |
| 7,905,621 | B1* | 3/2011 | Hickman | F21S 8/022 362/145 |
| 7,905,637 | B2* | 3/2011 | Caluori | F21S 8/02 336/105 |
| 8,115,289 | B2* | 2/2012 | Kishibata | H05K 1/148 257/415 |
| 8,360,390 | B2* | 1/2013 | Fornage | H05K 3/284 249/83 |
| 9,185,822 | B2* | 11/2015 | Shanbhogue | H05K 1/144 |

(Continued)

FOREIGN PATENT DOCUMENTS

| CN | 201414270 Y | 2/2010 |
| CN | 201661963 U | 12/2010 |

(Continued)

*Primary Examiner* — Hoa C Nguyen
*Assistant Examiner* — Keith Depew
(74) *Attorney, Agent, or Firm* — CKC & Partners Co., Ltd.

(57) ABSTRACT

A power supply includes a housing, a power module, a top cover, a sealing sheet, and a filling member. The power module is disposed in the housing. The top cover is disposed above the housing. The sealing sheet is at least partially disposed between the housing and the top cover. The filling member is disposed between the housing and the sealing sheet.

23 Claims, 8 Drawing Sheets

(56) References Cited

U.S. PATENT DOCUMENTS

| | | | | |
|---|---|---|---|---|
| 9,322,542 | B2* | 4/2016 | Stoneham | F21V 29/004 |
| 2004/0137173 | A1* | 7/2004 | Selverian | C08L 95/00 |
| | | | | 428/34.1 |
| 2005/0225947 | A1* | 10/2005 | Araujo | H05K 5/0008 |
| | | | | 361/719 |
| 2009/0272986 | A1 | 11/2009 | Chan et al. | |
| 2013/0094151 | A1* | 4/2013 | Escamilla | H05K 5/065 |
| | | | | 361/714 |

FOREIGN PATENT DOCUMENTS

| | | |
|---|---|---|
| CN | 102182993 A | 9/2011 |
| CN | 203136392 U | 8/2013 |
| TW | I352565 B | 11/2011 |

* cited by examiner

POWER SUPPLY AND METHOD FOR ASSEMBLING POWER SUPPLY

RELATED APPLICATIONS

This application claims priority to Chinese Application Serial Number 201410042041.7, filed Jan. 28, 2014, which are herein incorporated by reference.

BACKGROUND

In recent years, LEDs used as light bulbs have the advantage of long lifetime. Therefore, such LED light bulbs have the tendency to replace other conventional light sources. LEDs can be applied to various types of lamps, such as traffic lights, street lights, flashlights, and even car headlights.

As to outdoor power supplies for LED lamps, the cost of an outdoor power supply occupies a high proportion of the cost of an entire lamp system, and the cost of a housing and a filling member occupies a high proportion of the cost of the power supply. A common outdoor power supply uses an aluminum extrusion housing and silicone to fill the housing. However, because the cost of the silicone is high, the cost of the entire power supply may become higher.

SUMMARY

This disclosure provides a power supply to improve the Ingress Protection (IP) ratings.

In one embodiment, a power supply is provided. The power supply includes a housing, a power module, a top cover, a sealing sheet, and a filling member. The power module is disposed in the housing. The top cover is disposed above the housing. The sealing sheet is at least partially disposed between the housing and the top cover. The filling member is disposed between the housing and the sealing sheet.

In another embodiment, a method for assembling a power supply is provided. The method includes providing a housing, disposing a power module in the housing, filling the housing with a filling member, disposing a sealing sheet on the housing, and covering the sealing sheet with a top cover and assembling the top cover on the housing.

By disposing the sealing sheet between the housing and the top cover, a gap between the housing and the top cover is sealed, such that the IP ratings of the power supply are improved. In one aspect, the sealing sheet is an integer and will not be easily deformed, and the sealing sheet can be assembled conveniently and will not have the alignment problem with the housing.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
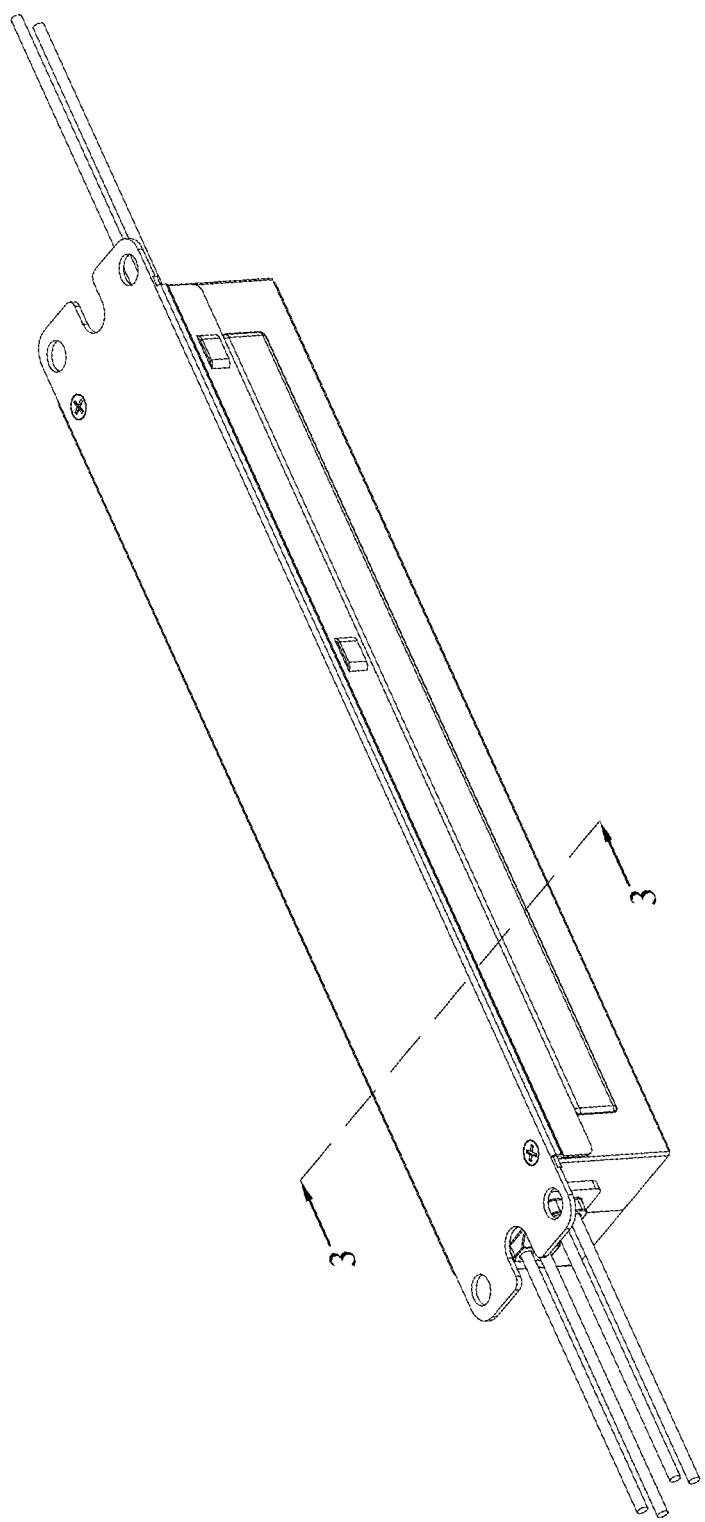
FIG. 1 is a 3-D view of a power supply according to one embodiment of this invention.
Figure 2:
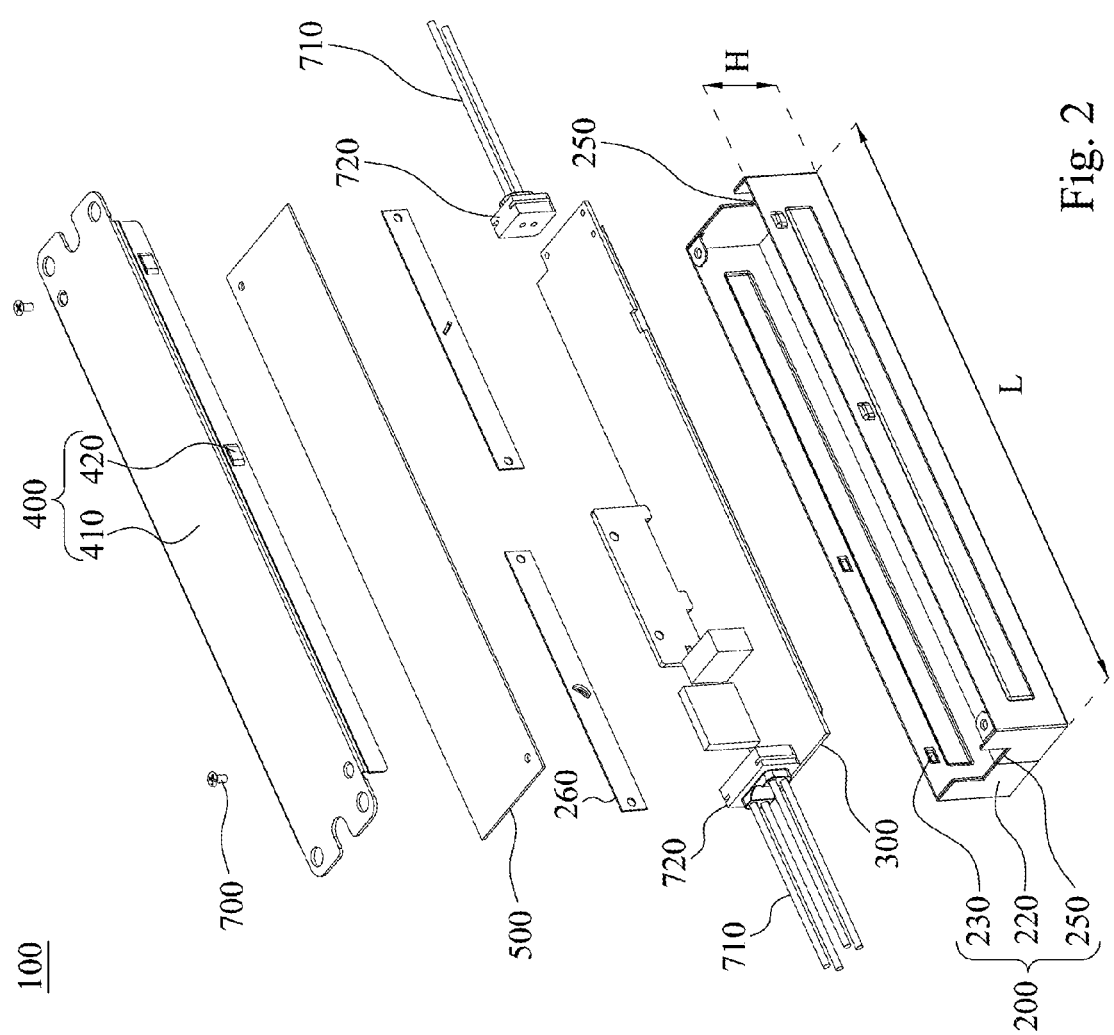
FIG. 2 is an exploded view of FIG. 1.
Figure 3:
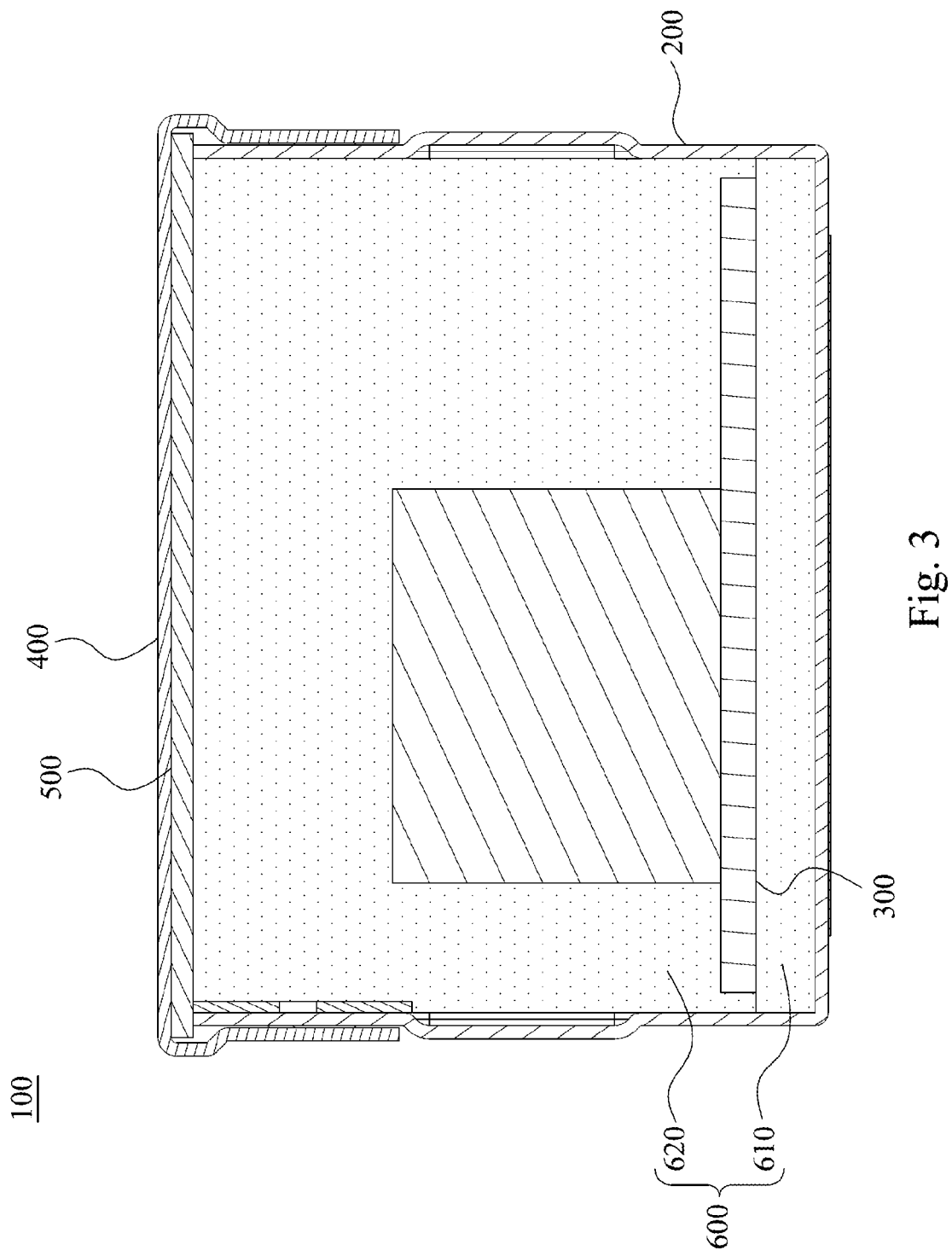
FIG. 3 is a cross-sectional view of FIG. 1.

FIG. 1 is a 3-D view of a power supply 100 according to one embodiment of this invention. FIG. 2 is an exploded view of FIG. 1. FIG. 3 is a cross-sectional view of FIG. 1. As shown in FIG. 1, FIG. 2, and FIG. 3, the power supply 100 is provided. The power supply 100 is mainly used as an outdoor power supply for a light-emitting diode (LED) lamp, and the power supply 100 is modified from an outdoor power supply for the LED lamp with Ingress Protection (IP) ratings 54 commonly used in the industry.

As shown in FIG. 2 and FIG. 3, the power supply 100 includes a housing 200, a power module 300, a top cover 400, a sealing sheet 500 and a filling member 600. The power module 300 is disposed in the housing 200. The top cover 400 is disposed above the housing 200. The sealing sheet 500 is at least partially disposed between the housing 200 and the top cover 400. The filling member 600 is disposed between the housing 200 and the sealing sheet 500.

Because the power supply 100 is usually located outdoors, the power supply 100 should have sufficient dustproof and waterproof capabilities, so as to protect the power module 300 disposed in the housing 200 from being damaged by the intruded dusts or the intruded moisture. The housing 200, the top cover 400, and the filling member 600 disposed in the housing 200 provide protection. By disposing the sealing sheet 500 between the housing 200 and the top cover 400 to seal a gap therebetween, the dustproof and waterproof capabilities of the power supply 100 are further improved.

In one embodiment, a material of the sealing sheet 500 is silicone. People having ordinary skill in the art can make proper modification to the material of the sealing sheet 500 according to their actual needs.

As shown in FIG. 3, an orthogonal projection area of the housing 200 on the sealing sheet 500 is smaller than an area of the sealing sheet 500, and an orthogonal projection area of the sealing sheet 500 on the top cover 400 is smaller than an area of the top cover 400. Therefore, the sealing sheet 500 may properly seal the gap between the housing 200 and the top cover 400.

A wall thickness of the housing 200 is about 0.6 mm, and a material of the housing 200 is metal. In this embodiment, the housing 200 is formed by bending a sheet metal. People having ordinary skill in the art can make proper modification to the housing 200 according to their actual needs.

Figure 4:
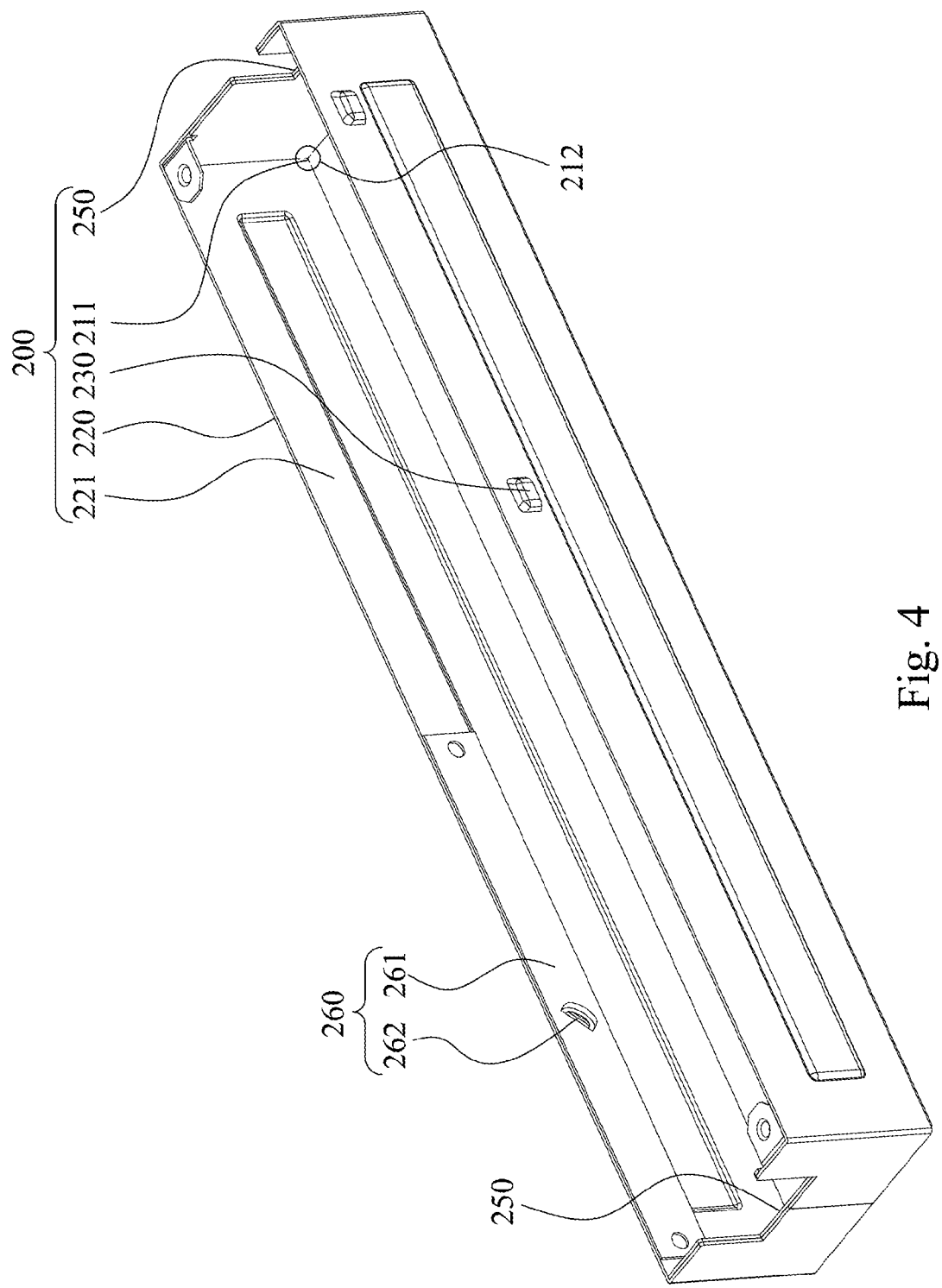
FIG. 4 is a 3-D view of a housing and a baffle according to one embodiment of this invention.

FIG. 4 is a 3-D view of the housing 200 and a baffle 260 according to one embodiment of this invention. As shown in FIG. 4, the housing 200 has inner corner vertices 211 and sealing elements 212 respectively disposed at the inner corner vertices 211.

Because the housing 200 is usually formed by bending the sheet metal, the housing 200 may not be totally sealed at the inner corner vertices 211, and a gap may be formed. The possible gaps located at the inner corner vertices may be sealed by disposing the sealing elements 212 at the inner corner vertices, and the dustproof and waterproof capabilities of the power supply 100 can be improved.

A material of the sealing elements 212 is silicone. People having ordinary skill in the art can make proper modification to the material of the sealing elements 212 according to their actual needs.

As shown in FIG. 3, a material of the filling member 600 is asphalt. The asphalt has an advantage of low cost, and thus using the asphalt as the material of the filling member 600 may effectively reduce the overall cost of the power supply 100.

As shown in FIG. 2 and FIG. 3, a shape of the housing 200 is similar to a cuboid, and the housing 200 has a height H and a length L. The side with the length L is the longest side of the housing 200, and the side with the height H is the side of the housing 200 perpendicular to the top cover 400. The height H is smaller than the length L. Because of poor fluidity of the asphalt, the height H is designed to be smaller than the length L, such that the housing 200 may not be too deep. Considering that it is difficult to fill a bottom of the power supply 100 with the asphalt, a portion of the asphalt with a thickness of about 3 mm is first poured in the housing 200 as the filling member 610, and then the power module 300 is disposed in the housing, and thereafter an interior space of the housing 200 is completely filled with the asphalt as the filling member 620.

As shown in FIG. 2 and FIG. 4, corresponding fixing members such as couplers or fasteners may be disposed on the housing 200 and the top cover 400 to fix the housing 200 and the top cover 400.

Specifically, the top cover 400 includes a top cover body 410 and the first coupling portions 420 disposed on the top cover body 400. The housing 200 includes a housing body 220 and second coupling portions 230 which are disposed on the housing body 220 and corresponding to the first coupling portions 420. The first coupling portions 420 are engaged with the second coupling portions 230.

Specifically, the power supply 100 further includes fasteners 700 fixing the top cover 400 to the housing 200. More specifically, the fasteners 700 may be screws.

In order to stably assemble the housing 200 with the top cover 400, the fixing members may be disposed at six points of the top cover 400, such as, four corners and central points of two longer sides of the top cover 400, and at positions of the housing 200 corresponding to the top cover 400.

Specifically, the number of the fasteners 700 is two, and the fasteners 700 are disposed at two diagonal corners of the top cover 400. The first coupling portions 420 are disposed at the central points of the two longer sides. Because the fasteners 700 may occupy the interior space of the housing 200, the fasteners 700 are merely disposed at two diagonal corners of the top cover 400, so as to save the interior space of the housing 200 for receiving circuit elements of the power module 300.

Figure 5:
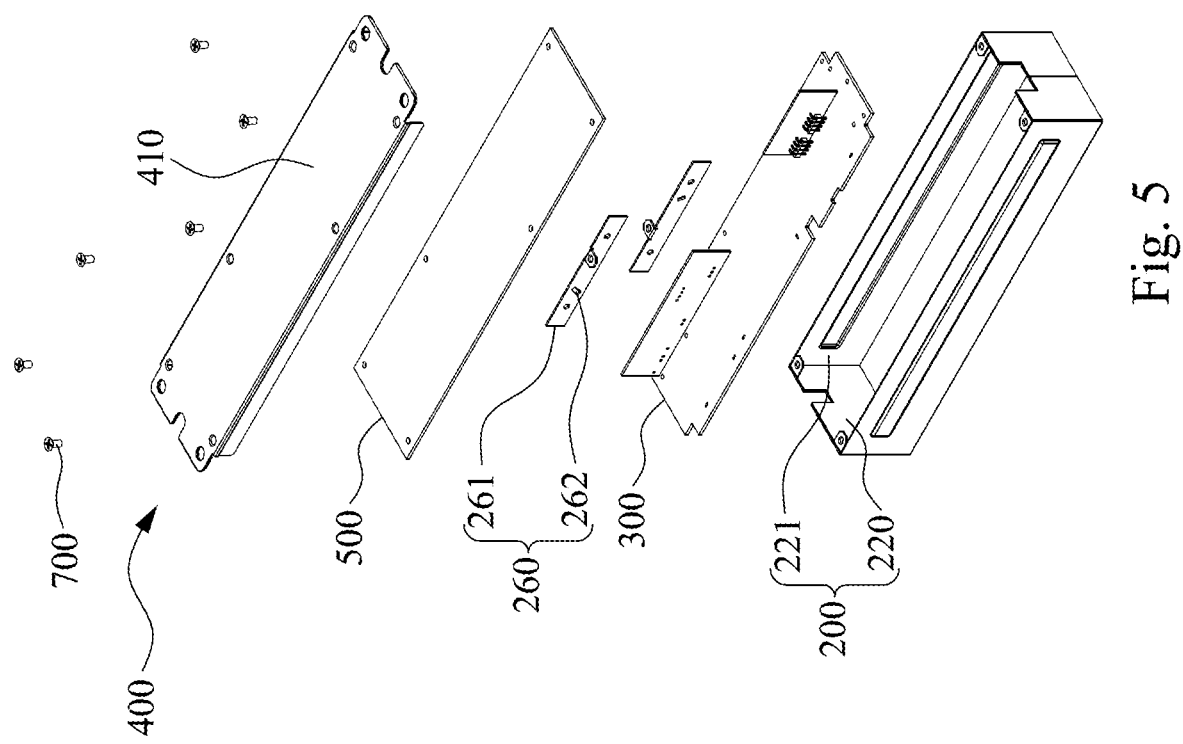
FIG. 5 is an exploded view of a power supply according to another embodiment of this invention.

In actual applications, there are plural ways to fix the top cover 400 and the housing 200. The number of the fasteners 700 may be six without coupling portions. FIG. 5 is an exploded view of the power supply 100 according to another embodiment of this invention. As shown in FIG. 5, the fasteners 700 are disposed at the central points of two longer sides and four corners of the top cover 400. The housing body 220 has an inner side surface 221. The power supply 100 further includes baffles 260 disposed on the inner side surface 221. Each of the baffles 260 includes a baffle body 261 and a protrusion 262 disposed on the baffle body 261. The protrusion 262 may be electrically connected to a ground wire of the power module 300, such that the housing 200 made of metal may act as a ground of the power module 300.

As shown in FIG. 2 to FIG. 4, the first coupling portions 420 outwardly protrude from the top cover body 410, and the second coupling portions 230 outwardly protrude from the housing body 220.

The housing body 220 of the housing 200 has an inner side surface 221. The power supply 100 further includes baffles 260 disposed on the inner side surface 221, and the baffles 260 may be disposed corresponding to the second coupling portions 230.

Because the coupling portions are often formed by outwardly boring the sheet metal, the coupling portions may enable the housing 200 and the top cover 400 to have opening holes. When being disposed on the inner side surface 221 of the housing 200, the baffles 260 may seal the opening, so as to improve the dustproof and waterproof capabilities of the power supply 100.

Specifically, each of the baffles 260 includes a baffle body 261 and a protrusion 262 disposed on the baffle body 261. The protrusion 262 may be electrically connected to the ground wire of the power module 300, such that the housing 200 made of metal may be a ground of the power module 300.

As shown in FIG. 2 and FIG. 4, the housing 200 further includes two grooves 250 disposed on both ends of the housing 200. The grooves 250 respectively act as a primary side wire outlet and a secondary side wire outlet for the power supply 100. An external lead and a grommet are disposed through the primary side wire outlet, and the external lead is electrically connected to the mains 220V. Another external lead and another grommet are disposed through the secondary side wire outlet, and the external lead is electrically connected to a matched lamp. Specifically, as shown in FIG. 2, the power supply 100 includes at least one external lead 710 and the grommet 720. One end of the external lead 710 on the primary side wire outlet is electrically connected to the power module 300, and the other end of the external lead 710 is electrically connected to the outer power supply such as the mains 220V. One end of the external lead 710 on the secondary side wire outlet is electrically connected to the power module 300, and the other end of the external lead 710 is electrically connected to the matched lamp. The grommet 720 integrally surrounds the external lead 710 and is disposed in the groove 250.

Figure 6:
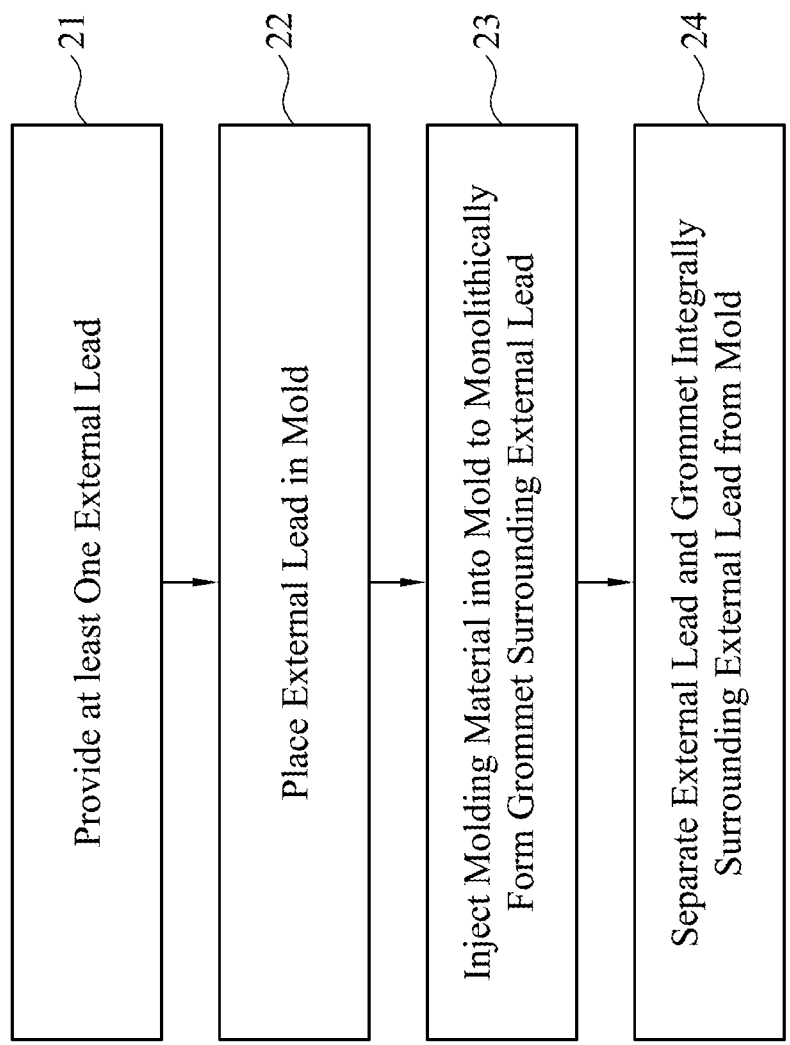
FIG. 6 is a flowchart of a method for monolithically forming a grommet and an external lead according to one embodiment of this invention.

FIG. 6 is a flowchart of a method for monolithically forming the grommet 720 and the external lead 710 according to one embodiment of this invention. As shown in FIG. 2 and FIG. 6, step 21 is performed to provide at least one external lead 710. Step 22 is performed to place the external lead 710 into a mold. Step 23 is performed to inject a molding material such as silicone into the mold to monolithically form the grommet 720 surrounding the external lead 710. Step 24 is performed to separate the external lead 710 and the grommet 720 integrally surrounding the external lead 710 from the mold.

Figure 7:
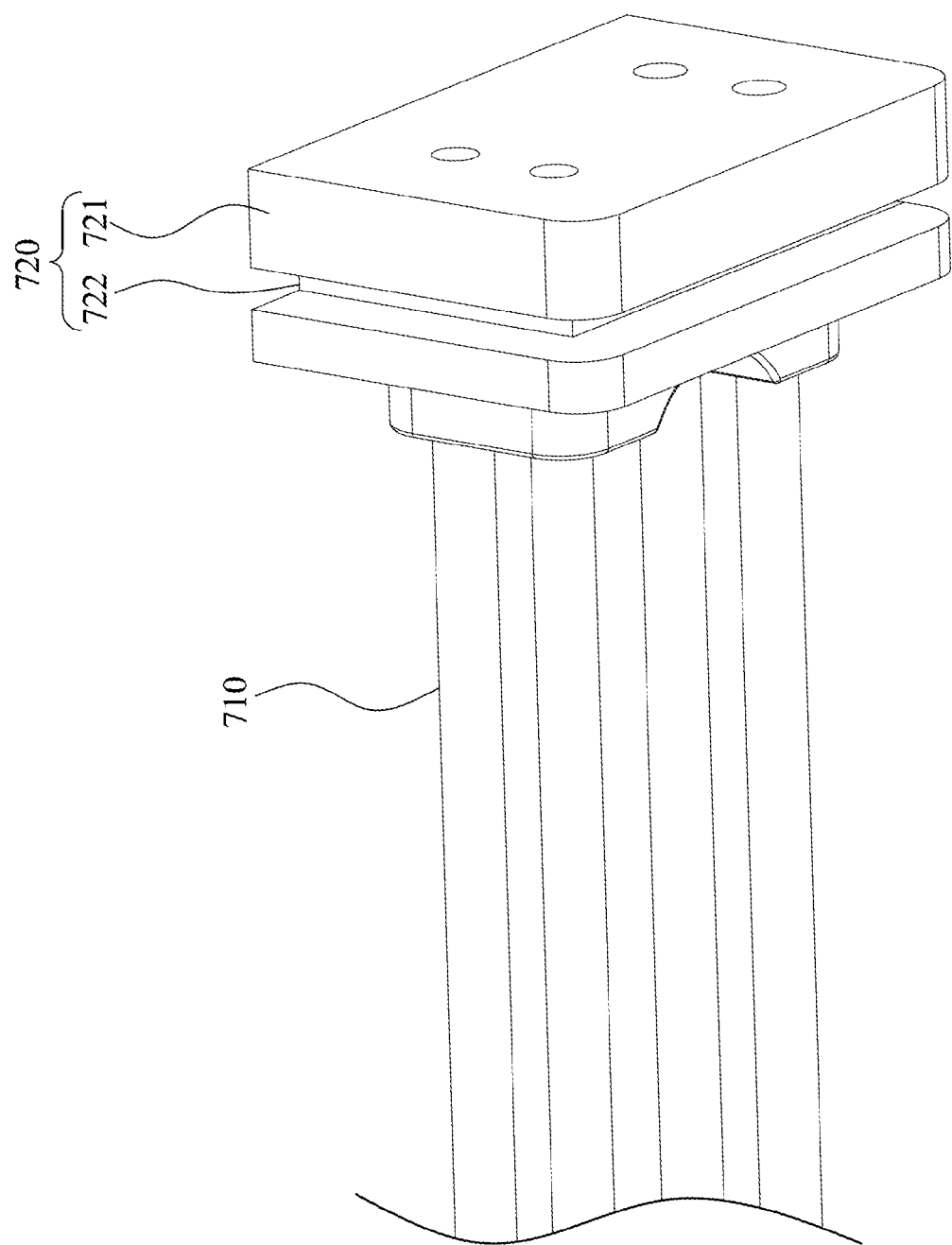
FIG. 7 is a 3-D view of the external lead and the grommet according to one embodiment of this invention.

FIG. 7 is a 3-D view of the external lead 710 and the grommet 720 according to one embodiment of this invention. As shown in FIG. 2 and FIG. 7, the grommet 720 and the external lead 710 may be monolithically formed through the method shown in FIG. 6. The grommet 720 includes a grommet body 721 and a recess 722. The grommet 720 is embedded in the groove 250 through the recess 722 so as to improve the tightness.

By disposing the grommet 720 in the groove 250 and integrally surrounding the external lead 710 with the grommet 720, the tightness between the external lead 710 and the housing 200 is effectively improved, and the dustproof and waterproof capabilities of the power supply 100 are improved as well.

A material of the grommet 720 is silicone. People having ordinary skill in the art can make proper modification to the material of the grommet 720 according to their actual needs.

By using the aforementioned designs, the dustproof and waterproof capabilities of the power supply 100 may be effectively improved, and the IP ratings of the power supply 100 may be improved to 66 when the material of the filling member 600 is asphalt. The power supply 100 passes tests of IP6X (Dust Test: a sample is installed in a chamber for 8 hours a pressure of 20 mbar, in which talcum powder with a density of 2 kg per cubic meter and a size smaller than 0.075 mm is distributed in the chamber, and then a test is performed to determine whether the sample is operated properly) and IPX6 (Powerful Jetting Test: water is sprayed from different directions on a sample for 3 minutes, in which a nozzle with a internal diameter of 12.5 mm is used, and a distance between the nozzle and the sample is 2.5 meters to 3 meters, and a delivery rate of the water is equivalent to 100 liters per minute, and then a test is performed to determine whether the sample is operated properly). Thus, the power supply 100 has an advantage of low cost and high IP ratings.

Figure 8:
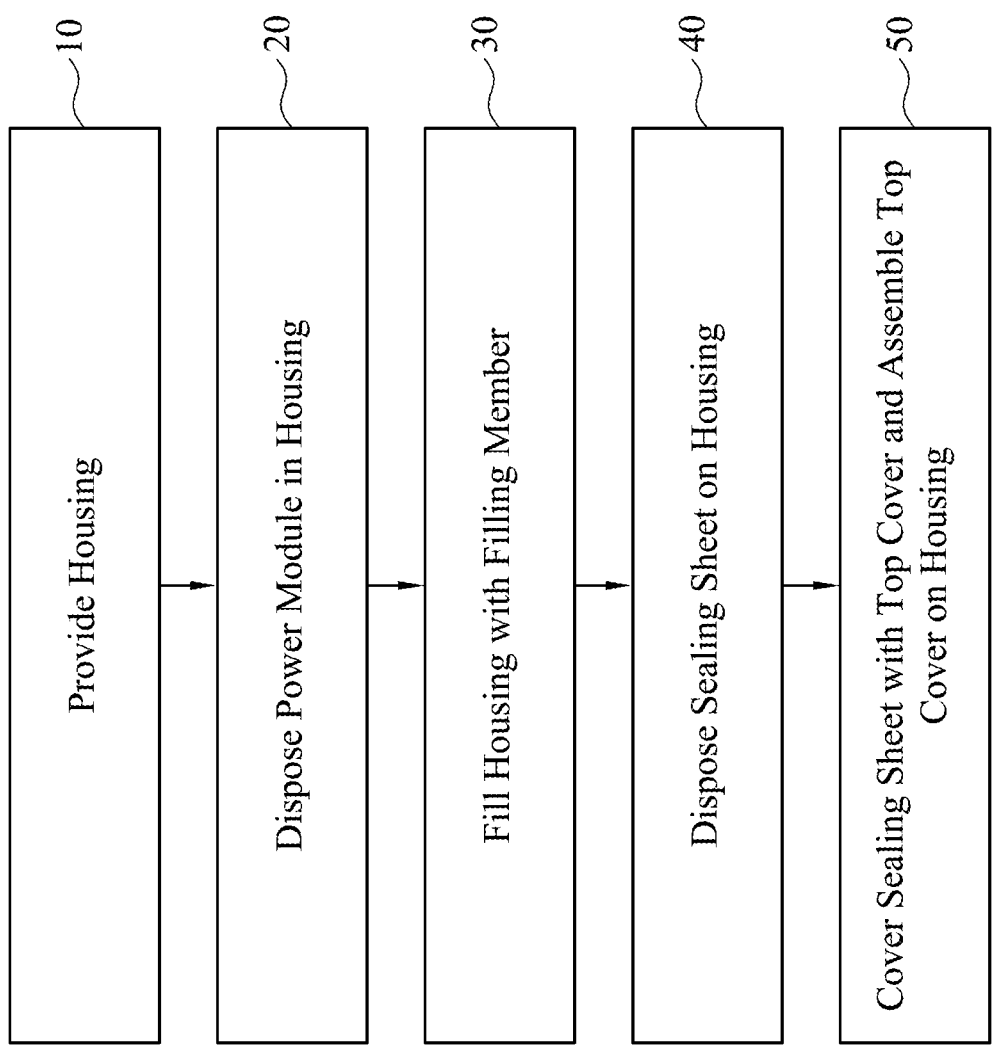
FIG. 8 is a flowchart of a method for assembling a power supply according to one embodiment of this invention.

FIG. 8 is a flowchart of a method for assembling the power supply 100 according to one embodiment of this invention. A method for assembling the power supply 100 is provided. The power supply 100 is shown in FIG. 1 to FIG. 4 and FIG. 7, and the assembly method is shown in FIG. 2, FIG. 3, and FIG. 8. Step 10 is performed to provide the housing 200. Step 20 is performed to dispose the power module 300 in the housing 200. Step 30 is performed to fill the housing 200 with the filling member 600. Step 40 is performed to dispose the sealing sheet 500 on the housing 200. Step 50 is performed to cover the sealing sheet 500 with the top cover 400 and to assemble the top cover 400 and the housing 200 together.

In step 10, the housing 200 of FIG. 2 and FIG. 4 may be provided by bending a sheet metal. In order to improve the tightness of the housing 200, step 10 may further include disposing the sealing elements 212 at the inner corner vertices 211 of the housing 200, and disposing the baffles 260 on the inner side surface 221 of the housing 200. The baffles 260 may be corresponding to the second coupling portions 230.

As shown in FIG. 2, the method for assembling the power supply 100 may further include disposing the grooves 250 on both ends of the housing 200, and then disposing the external lead 710 and the grommet 720 integrally surrounding the external lead 710 in each of the grooves 250. The step of disposing the external lead 710 and the grommet 720 may be performed after step 20, and then the external lead 710 is electrically connected to the power module 300.

As shown in FIG. 3, Step 10 further includes filling the housing 200 with a portion of the filling member 610 in advance, and then step 20 is performed. Specifically, the power module 300 is disposed on the portion of the filling member 610, such that the power module 300 is supported by the portion of the filling member 610 and circuits of the power module 300 may not accidentally touch the housing 200 made of metal, so as to avoid a short circuit.

As shown in FIG. 2 and FIG. 3, specifically, the other portion of the filling member 620 is placed on the power module 300 from a top opening of the housing 200. Materials of the filling member 610 and the filling member 620 may be the same or different. In this embodiment, the materials of the filling member 610 and the filling member 620 are both asphalt, but are not limited thereto. The filling member 620 may isolate and protect the power module 300 from being damaged by the intruded dusts or the intruded moisture. Though the filling member 600 fills the housing 200 in two steps in this embodiment, in other embodiments, the power module 300 may be directly disposed in the housing 200 before the filling member 600 is placed in the housing 200, and then the filling member 600 fills the housing 200.

In step 40, because the sealing sheet 500 is in a sheet shape, the sealing sheet 500 is not easy to be deformed, and can be aligned with the housing 200 easily, thus having the advantage of convenient assembling.

A thickness of the sealing sheet 500 before assembling is about 1.5 mm. People having ordinary skill in the art can make proper modification to the thickness of the sealing sheet 500 according to their actual needs.

In step 50, when the top cover 400 and the housing 200 are assembled, the sealing sheet 500 is compressed by the top cover 400 and the housing 200 (and the filling member 600), such that the sealing sheet 500 seals a gap between the top cover 400 and the housing 200. In addition, because the material of the sealing sheet 500 is silicone which is elastic, the sealing sheet 500 is compressed after the top cover 400 and the housing 200 are assembled. The thickness of the sealing sheet 500 may be compressed from 1.5 mm to 1 mm.

As shown in FIG. 2 and FIG. 4, in step 50, the top cover 400 and the housing 200 may be assembled by engaging the first coupling portions 420 with the second coupling portions 230 via a gauge or by fixing the top cover 400 to the housing 200 via the fasteners 700. Alternatively, the top cover 400 and the housing 200 may be assembled by first engaging the first coupling portions 420 with the second coupling portions 230 via the gauge and then fixing the top cover 400 to the housing 200 via the fasteners 700.

By disposing the sealing sheet 500 between the housing 200 and the top cover 400, a gap between the housing 200 and the top cover 400 is sealed, such that the IP ratings of the power supply 100 are improved. In addition, the sealing sheet 500 is not easy to be deformed due to its sheet shape, and the sealing sheet 500 is easy to be aligned with the housing 200 for convenient assembling.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

What is claimed is:

1. A power supply, comprising:
   a housing having a plurality of inner corner vertices and a plurality of sealing elements respectively disposed at the inner corner vertices;
   a power module disposed in the housing;
   a top cover disposed above the housing;
   a sealing sheet at least partially disposed between the housing and the top cover, wherein the sealing sheet substantially covers a cavity of the housing; and
   a filling member disposed between the housing and the sealing sheet.

2. The power supply of claim 1, wherein a material of the sealing elements comprises silicone.

3. The power supply of claim 1, wherein the housing comprises a housing body, and the housing body has an inner side surface, and the power supply further comprises a plurality of baffles disposed on the inner side surface.

4. The power supply of claim 3, wherein each of the baffles comprises a baffle body and a protrusion disposed on the baffle body.

5. The power supply of claim 1, wherein the top cover comprises a top cover body and a plurality of the first coupling portions disposed on the top cover body; and
   the housing comprises:
   a housing body; and
   a plurality of second coupling portions disposed on the housing body and corresponding to the first coupling portions, wherein the first coupling portions are engaged with the second coupling portions.

6. The power supply of claim 5, wherein the first coupling portions outwardly protrude from the top cover body, and the second coupling portions outwardly protrude from the housing body.

7. The power supply of claim 6, wherein the housing body has an inner side surface, and the power supply further comprises a plurality of baffles disposed on the inner side surface and corresponding to the second coupling portions.

8. The power supply of claim 7, wherein each of the baffles comprises a baffle body and a protrusion disposed on the baffle body.

9. The power supply of claim 1, further comprising:
   a plurality of fasteners fixing the top cover to the housing.

10. The power supply of claim 9, wherein the number of the fasteners is two, and the fasteners are disposed in two diagonal corners of the top cover.

11. The power supply of claim 1, wherein the housing comprises:
    at least one groove disposed on one end of the housing;
    at least one external lead electrically connected to the power module; and
    a grommet integrally surrounding the external lead and disposed in the groove.

12. The power supply of claim 1, wherein a material of the filling member comprises asphalt.

13. The material of claim 1, wherein a material of the sealing sheet comprises silicone.

14. The power supply of claim 1, wherein an orthogonal projection area of the housing on the sealing sheet is smaller than an area of the sealing sheet and an orthogonal projection area of the sealing sheet on the top cover is smaller than an area of the top cover.

15. The power supply of claim 1, wherein the housing has a height and a length, and the height is smaller than the length.

16. The power supply of claim 14, wherein the housing comprises a housing body, and the housing body has an inner side surface, and the power supply further comprises a plurality of baffles disposed on the inner side surface.

17. The power supply of claim 16, wherein each of the baffles comprises a baffle body and a protrusion disposed on the baffle body.

18. The power supply of claim 14, wherein the top cover comprises a top cover body and a plurality of the first coupling portions disposed on the top cover body; and
    the housing comprises:
    a housing body; and
    a plurality of second coupling portions disposed on the housing body and corresponding to the first coupling portions, wherein the first coupling portions are engaged with the second coupling portions.

19. The power supply of claim 18, wherein the first coupling portions outwardly protrude from the top cover body, and the second coupling portions outwardly protrude from the housing body.

20. The power supply of claim 19, wherein the housing body has an inner side surface, and the power supply further comprises a plurality of baffles disposed on the inner side surface and corresponding to the second coupling portions.

21. The power supply of claim 20, wherein each of the baffles comprises a baffle body and a protrusion disposed on the baffle body.

22. The power supply of claim 14, further comprising: a plurality of fasteners fixing the top cover to the housing.

23. The power supply of claim 22, wherein the number of the fasteners is two, and the fasteners are disposed in two diagonal corners of the top cover.

* * * * *